(12) United States Patent
Xu

(10) Patent No.: US 6,555,147 B1
(45) Date of Patent: Apr. 29, 2003

(54) METHODS FOR MAKING POPCORN KERNELS WITH IMPROVED FLAKE PRODUCTION

(75) Inventor: Feng Xu, Davis, CA (US)

(73) Assignee: Novozymes Biotech, Inc., Davis, CA (US)

( * ) Notice: Subject to any disclaimer, the term of this patent is extended or adjusted under 35 U.S.C. 154(b) by 0 days.

(21) Appl. No.: 09/633,311

(22) Filed: Aug. 7, 2000

Related U.S. Application Data

(63) Continuation-in-part of application No. 09/369,473, filed on Aug. 6, 1999, now abandoned.

(51) Int. Cl.$^7$ .................................................. A23B 9/28
(52) U.S. Cl. ............................ 426/50; 426/52; 426/629
(58) Field of Search .............................. 426/52, 28, 31, 426/18, 44, 50, 442, 460, 808, 507, 629

(56) References Cited

PUBLICATIONS

Lorenz et al. *Handbook of Cereal Science. . .* , Marcel Dekker, Inc. Pubish., pp. 65–66, Jan. 1991.*
Wu et al. "Enzyme treatment of popcorn . . . ", *Cereal Chemistry*, 70(4): 443–447, Jul.–Aug. 1993.*
Reeve and Walker, May 1969, *Cereal Chemistry* 46: 227–241.
Hoseney et al., Jan. 1983, *Journal of Cereal Science* 1: 43–52.
Kiesselbach and Walker, Oct. 1952, *American Journal of Botany* 39: 361–569.
Hood et al., Jul. 1991, *Plant Science* 79: 13–22.

* cited by examiner

*Primary Examiner*—Keith Hendricks
(74) *Attorney, Agent, or Firm*—Robert L. Starnes

(57) ABSTRACT

The present invention relates to methods for making enzyme-treated unpopped popcorn kernels, comprising: (a) contacting the popcorn kernels with an aqueous solution comprising an effective amount of one or more hull wall-degrading enzymes for a period of time sufficient to weaken the hull wall of the kernels; and (b) recovering the enzyme-treated popcorn kernels. The present invention also relates to popcorn kernels obtained by the methods of the present invention.

19 Claims, No Drawings

METHODS FOR MAKING POPCORN KERNELS WITH IMPROVED FLAKE PRODUCTION

CROSS-REFERENCE TO RELATED APPLICATION

This application is a continuation-in-part of U.S. application Ser. No. 09/369,473 filed on Aug. 6, 1999, now abandoned which application is fully incorporated herein by reference.

BACKGROUND OF THE INVENTION

1. Field of the Invention

The present invention relates to methods for making enzyme-treated unpopped popcorn kernels for improving the yield of popped popcorn.

2. Description of the Related Art

Popcorn is different from other types of maize by its capacity to form large flakes when popcorn kernels are subjected to heat, an effect known as popping expansion. Popcorn kernels consist of three main structural parts: pericarp, germ, and endosperm (Reeve and Walker, 1969, *Cereal Chemistry* 46: 227–241; Hoseney et al, 1983, *Journal of Cereal Science* 1: 43–52). The pericarp serves as a tough protective layer surrounding the kernel and participates directly in the popping action of popcorn. The pericarp is composed of many tightly packed layers which depending on the variety consists of both thick and thin pericarps. Immediately inside the pericarp is a single layer of thick-walled aleurone cells, these being the outer layer of the endosperm. The endosperm consists of two types: mostly translucent endosperm and smaller amounts of opaque endosperm. The translucent endosperm contains closely arranged polygonal starch granules while the opaque endosperm contains large, smooth spherical granules with many intergranular spaces. The proportion of translucent endosperm appears to be closely associated with popping expansion. The germ affects the texture of the flakes, but contributes the least to the popping.

Most popcorn in use today is hybrid popcorn that replaced the open-pollinated varieties. Hybrid popcorn is characterized as having improved yield, better standing ability, more uniform kernel type, and better popping expansion. The maximum popping potential of hybrid popcorn can be achieved only if it reaches full maturity. Popcorn hybrids move through commercial channels as three kernel types, which include white, small yellow, and large yellow, but now some medium kernel yellows are available. White popcorn characteristically has a rice-shaped kernel, while yellow popcorn kernels are pearl-shaped.

Hoseney el al., 1983, supra, have described the mechanism of popcorn popping. The popping expansion results from a small amount of water stored in a circle of soft starch inside the kernel's pericarp or hull wall. When heated, the water expands until the pericarp ruptures wherein the water vaporizes providing the driving force for expansion of the kernel leading to the explosion of the kernel into a flake. The pericarp or hull serves as a pressure vessel that allows the moisture held in the kernel to turn into superheated steam. Eventually the hull can no longer withstand the internal pressure and the wall of the hull ruptures. The rupture occurs at temperatures in the range of 350–375° F. These temperatures correspond to saturated steam pressures inside the kernel of 135–185 psi.

When the kernel pops, the pericarp separates between the seed coat and the aleurone cells where the pericarp is blown free and appears to undergo no change in structure other than the fracture failure. Popping does not alter the germ chemically or physically. The aleurone cells as well as the outer edge of the endosperm undergo minimal change in structure. However, deeper in the endosperm, the starch in the translucent endosperm greatly expands due to gelatinization, whereas in the opaque endosperm large voids are produced and the starch remains unchanged.

The maximum popping yield of a batch of popcorn kernels is generally reported to be greater than 90%, even though in practice this percentage can be much lower. The reduction in maximum popping yield is primarily attributed to the loss of moisture content of the kernel where 13.5% is optimal for achieving maximum popping yield. It is known that a 1% drop below 13.5% in moisture can harm the popping quality, and a 3% drop in moisture can render popcorn unpoppable. However, the kernels can be partially or completely rejuvenated by rehydration.

It is an object of the present invention to improve the yield of popped flakes from popcorn kernels.

SUMMARY OF THE INVENTION

The present invention relates to methods for making enzyme-treated unpopped popcorn kernels, comprising: (a) contacting the kernels with an aqueous solution comprising an effective amount of one or more hull wall-degrading enzymes for a period of time sufficient to weaken the hull wall of the kernels; and (b) recovering the enzyme-treated popcorn kernels.

The present invention also relates to popcorn kernels obtained by the methods of the present invention.

DESCRIPTION OF THE INVENTION

The present invention relates to methods for making enzyme-treated popcorn kernels by sufficiently degrading the hull wall of the kernels with an aqueous solution comprising an effective amount of one or more hull wall-degrading enzymes and recovering the enzyme-treated kernels, wherein the enzyme treatment increases the yield of popped flakes from a given weight of popcorn kernels.

In the methods of the present invention, the popcorn may be of any type, such as open-pollinated varieties or hybrid varieties. The popcorn is preferably a hybrid popcorn, and more preferably white, small yellow, medium yellow, and/or large yellow popcorn.

The cultivation of popcorn with regard to soil type, soil fertility, planting, weed control, insect control, disease control, irrigation, harvesting, conditioning, and storage are well known in the art.

The popcorn kernels may be harvested by hand, on the ear, or by combine. Popcorn can be hand-harvested anytime after it reaches maturity (i.e., 35% moisture) or ear-harvested at 25% moisture. Combine-harvested kernels should have a field moisture of about 14% to about 18%, with the optimum being about 16% to about 17% moisture. Above 18% moisture, the kernels may undergo physical damage, which lowers popping volume. Below 14% moisture, the kernels are susceptible to impact damage especially from combining and associated handling operations, which can also lower popping volume.

In the methods of the present invention, the kernels prior to enzyme treatment preferably have a moisture content in the range of about 10 to about 25%, more preferably about 14% to about 20%, even more preferably about 14% to about 18%, and more preferably about 15% to about 17%.

Kernels with an unsuitable moisture content may be partially dried using a heated or unheated forced-air system or natural ventilation known in the art for such purposes. The drying process should be such that it does not affect the potential popping yield of the kernels.

Higher quality kernels can be expected if drying is performed in several stages with a 12–24 hour tempering period between stages to allow for moisture redistribution within the kernels. An alternative to this is a two-stage combination drying system where a heated-air dryer is used to reduce moisture content to approximately 17–18%, then a natural air or low temperature drying system finishes the conditioning process.

If the kernels are over-dried, they can be re-hydrated to the desired moisture content, but generally they will not recover their initial popping volume. Any method known in the art for re-conditioning over-dried kernels may be used. It is preferable to pass 70–85% relative humidity through the kernels for a sufficient period of time, which depends on the air flow rate and the amount of re-hydration needed until the desired moisture content is achieved.

The term "effective amount of one or more hull wall-degrading enzymes" is defined herein as the amount of one or more enzymes that is sufficient for weakening the pericarp component of popcorn kernels to increase the yield of popped flakes from a given weight of unpopped popcorn kernels when subjected to heat in the range of 350–375° F. The effective amount of the one or more hull wall-degrading enzymes will depend on the enzyme(s) and the period of time desirable for degrading the hull wall. High amounts of the enzyme(s) will likely require shorter times of treatment while low amounts longer times.

In the methods of the present invention, one or more enzymes may be used which can weaken the hull wall of popcorn kernels. The pericarp component of popcorn kernels is composed primarily of cellulose plus pectic substances, lignin, and hydroxyproline-rich glycoproteins (Kiesselbach and Walker, 1952, *American Journal of Botany* 39:561–569; Hood et al., 1991, *Plant Science* 79: 13–22). The one or more enzymes may be any enzyme(s), which can weaken the hull wall of popcorn kernels. Enzymes that can degrade these hull wall components include, but are not limited to, pectin-degrading enzymes, cellulose-degrading enzymes, hemicellulose-degrading enzymes, and/or proteolytic enzymes.

In the methods of the present invention, any enzyme(s) may be used which possesses suitable enzyme activity in a pH and temperature range appropriate for weakening the hull wall of popcorn kernels. It is preferable that the enzyme (s) is active over broad pH and temperature ranges.

In a preferred embodiment, the enzyme(s) has a pH optimum in the range of about 3 to about 10. In a more preferred embodiment, the enzyme(s) has a pH optimum in the range of about 4 to about 9. In a most preferred embodiment, the enzyme(s) has a pH optimum in the range of about 5 to about 8.

In another preferred embodiment, the enzyme(s) has a temperature optimum in the range of about 5° C. to about 100° C. In a more preferred embodiment, the enzyme(s) has a temperature optimum in the range of about 25° C. to about 75° C. In a most preferred embodiment, the enzyme(s) has a temperature optimum in the range of about 25° C. to about 50° C.

In a preferred embodiment, the one or more hull wall-degrading enzymes are pectin-degrading enzymes, cellulose-degrading enzymes, hemicellulose-degrading enzymes, and/or proteolytic enzymes. In a more preferred embodiment, the pectin-degrading enzyme is an arabinase, galactanase, pectin esterase (e.g., pectin methylesterase and pectin acetylesterase), pectate lyase, pectin transeliminase, rhamnogalacturonan acetylesterase, or rhamnogalacturonase. In another more preferred embodiment, the cellulose-degrading enzyme is a cellulase or cellubiase. In another more preferred embodiment, the hemicellulose-degrading enzyme is a hemicellulase or xylanase. In another more preferred embodiment, the proteolytic enzyme is an aminopeptidase, carboxypeptidase, or endoprotease.

In the methods of the present invention, it is preferred that combinations of pectin-degrading enzymes, cellulose-degrading enzymes, and/or proteolytic enzymes are used in the practice of the invention.

The source of the enzyme(s) is not critical for weakening the hull wall of popcorn kernels. Accordingly, the enzyme(s) may be obtained from any source such as a plant, microorganism, or animal. The enzyme(s) is preferably obtained from, e.g., a microbial source, such as a bacterium or a fungus, e.g., a filamentous fungus or a yeast.

In a preferred embodiment, the enzyme(s) is obtained from a bacterial source. For example, the enzyme(s) may be obtained from an Acelobacter, Acinetobacter, Agrobacterium, Alcaligenes, Arthrobacter, Azotobacter, Bacillus, Comamonas, Clostridium, Gluconobacter, Halobacterium, Mycobacterium, Rhizobium, Salmonella, Serratia, Streptomyces, *E. coli*, Pseudomonas, Wolinella, or methylotrophic bacterium strain.

In a more preferred embodiment, the enzyme(s) is obtained from an *Acetobacter aceti, Alcaligenes faecalis, Arthrobacter oxidans, Azotobacter vinelandii, Bacillus alkalophilus, Bacillus amyloliquefaciens, Bacillus anitratum, Bacillus brevis, Bacillus circulans, Bacillus coagulans, Bacillus lautus, Bacillus lentus, Bacillus licheniformis, Bacillus megaterium, Bacillus stearothermophilus, Bacillus subtilis, Bacillus thuringiensis, Comamonas testosteroni, Clostridum tyrobutyricum, Gluconobacter dioxyaceticus, Gluconobacter liquefaciens, Gluconobacter suboxydans, Halobacterium cutirubrum, Mycobacterium convolutum, Rhizobium melioti, Salmonella lyphimurium, Serratia marcescens, Streptomyces lividans, Sireptomyces murinus, Pseudomonas aeruginosa, Pseudomonas fluorescens, Pseudomonasputida*, or *Wolinella succinogens* strain.

In another preferred embodiment, the enzyme(s) is obtained from a fungal source. For example, the enzyme(s) may be obtained from a yeast strain such as a Candida, Kluyveromyces, Pichia, Saccharomyces, Schizosaccharomyces, or Yarroivia strain; or from a filamentous fungal strain such as an Acremonium, Aspergillus, Aureobasidium, Chrysosporium, Cryptococcus, Filibasidium, Fusarium, Humicola, Magnaporthe, Monilia, Mucor, Myceliophthora, Neocallimastix, Neurospora, Paecilomyces, Penicillium, Phanerochaete, Piromyces, Schizophyllum, Sclerotium, Sporotrichum, Talaromyces, Thermoascus, Thielavia, Tolypocladium, or Trichoderma strain.

In another more preferred embodiment, the enzyme(s) is obtained from a *Saccharomyces carlsbergensis, Saccharomyces cerevisiae, Saccharomyces diastaticus, Saccharomyces douglasii, Saccharomyces kluyveri, Saccharomyces norbensis,* or *Saccharomyces oviform is* strain.

In another more preferred embodiment, the enzyme(s) is obtained from an *Aspergillus aculeatus, Aspergillus awamori, Aspergillus foetidus, Aspergillus japonicus,*

*Aspergillus nidulans, Aspergillus niger, Aspergillus oryzae, Chrysosporium lignorum, Fusarium bactridioides, Fusarium cerealis, Fusarium crookwellense, Fusarium culmorum, Fusarium graminearum, Fusarium graminum, Fusarium heterosporum, Fusarium negundi, Fusarium oxysporum, Fusarium reticulatum, Fusarium roseum, Fusarium sambucinum, Fusarium sarcochroum, Fusarium sulphureum, Fusarium toruloseum, Fusarium trichothecioides, Fusarium venenatum, Humicola insolens, Humicola lanuginosa, Monilia sitophila, Mucor miehei, Myceliophihora thermophila, Neurospora crassa, Penicillium purpurogenum, Phanerochaete chrysporum, Polyporus pinsitus, Polyporus versicolor, Sclerotium rolfsii, Sporotrichum thermophilum, Trichoderma citrinoviride, Trichoderma hamatum, Trichoderma harzianum, Trichoderma koningii, Trichoderma longibrachiatum, Trichoderma polysporum, Trichoderma reesei, Trichoderma saturnisporum,* or *Trichoderma viride* strain.

The enzyme(s) may be obtained from an organism in question by any suitable technique, and in particular by use of recombinant DNA techniques known in the art (c.f. Sambrook, J. et al., 1989, *Molecular Cloning, A Laboratory Manual*, Cold Spring Harbor Press, Cold Spring Harbor, N.Y., USA). The use of recombinant DNA techniques generally comprises cultivation of a host cell transformed with a recombinant DNA vector, consisting of the product gene of interest inserted between an appropriate promoter and terminator, in a culture medium under conditions permitting the expression of the enzyme and recovering the enzyme from the culture. The DNA sequence may be of genomic, cDNA, or synthetic origin, or any mixture of these, and may be isolated or synthesized in accordance with methods known in the art. The enzyme may also be obtained from its naturally occurring source, such as a plant or organism, or relevant part thereof. Furthermore, the enzyme(s) may be obtained from commercial suppliers.

The enzyme treatment of the kernels may be conducted during any step of popcorn production, such as during field harvesting, washing, pre-drying, storing, hydrating, or flavoring. For example, the enzyme(s) may be introduced into the liquids used for washing, hydrating, or flavoring. Alternatively, a new step may be added during the processing for accomplishing the enzyme treatment.

The treatment time will depend on the enzyme(s) and the dosage of the enzyme(s). Where the enzyme treatment is conducted as part of one or more of the steps conventionally used in the processing of popcorn, the treatment time should preferably be adapted to the time normally used during the processing of the kernels, such as during field harvesting, washing, hydrating, storing, or flavoring. Consequently, the dosage of the enzyme(s) may be adjusted according to the time period used during the processing. However, where the enzyme treatment is a separate step in the processing, the dosage of the enzyme(s) used will depend on the time period desired to accomplish the treatment.

In terms of enzyme activity, the appropriate dosage of a given enzyme for weakening the hull wall of popcorn kernels will depend on the enzyme in question. The skilled person may determine a suitable enzyme unit dosage on the basis of enzyme assays well known in the art that are specific to the enzyme activity of interest. For example, see D. Schomburg and M. Salzmann (editors), 1990, *Enzyme Handbook*, Springer-Verlag, New York; Von Worthington, 1993, *Worthington Enzyme Manual*, Worthington Biochemical Corporation, Freehold, N.J.; and Hans Ulrich Bergmeyer (editor), 1974, *Methods of Enzymatic Analysis*, Verlag Chemie Weinheim, Academic Press, Inc. New York.

The appropriate dosage of a specific enzyme or mixture of two or more enzymes may be determined by incubating for 1–7 days at room temperature 0.3 ml of a solution containing varying dosages of the one or more enzymes with 10 g of popcorn kernels having a 10% to 25% moisture content in a 25 ml sealed container, where the kernels occupy 75% of the container's volume. Shorter treatment times of less than 24 hours may also be used, such as 1 or more hours. Following the incubation, the popping potential of the enzyme-treated kernels relative to a control containing no enzyme(s) is then determined using any of the conventional techniques known in the art, e.g., microwave, heating in oil.

In the methods of the present invention, popcorn kernels are preferably treated for 1 to 7 days, more preferably 1 to 5 days, even more preferably 1 to 3 days, and most preferably 1 to 2 days, with a corresponding enzyme dosage of preferably 0.001 to 1 g, more preferably 0.01 to 1 g, even more preferably 0.01 to 0.5 g, and most preferably 0.01 to 0.1 g of enzyme per kilogram of popcorn kernels.

The enzyme(s) to be used in the methods of the present invention may be in any form suitable for the use in question, e.g., in the form of a dry powder, agglomerated powder, or granulate, in particular a non-dusting granulate, liquid, in particular a stabilized liquid, or protected enzyme. Granulates and agglomerated powders may be prepared by conventional methods, e.g., by spraying the enzyme(s) onto a carrier in a fluid-bed granulator. The carrier may consist of particulate cores having a suitable particle size. The carrier may be soluble or insoluble, e.g., a salt (such as NaCl or sodium sulfate), sugar (such as sucrose or lactose), sugar alcohol (such as sorbitol), or starch. The enzyme(s) and/or additional enzymes may be contained in slow-release formulations. Methods for preparing slow-release formulations are well known in the art. Liquid enzyme preparations may, for instance, be stabilized by adding nutritionally acceptable stabilizers such as a sugar, sugar alcohol, or another polyol, and/or lactic acid or another organic acid according to established methods.

Commercially available enzymes useful in the methods of the present invention include, but are not limited to, PECTINEX™ (an *Aspergillus niger* pectinase preparation containing mainly pectinase, hemicellulase, and cellulase, available from Novo Nordisk A/S, Bagsværd, Denmark); CITROZYM™ (an *Aspergillus niger* enzyme preparation containing pectinase, hemicellulase and arabinase, available from Novo Nordisk A/S, Bagsværd, Denmark); OLIVEX™ (an *Aspergillus aculeatus* enzyme preparation containing pectinase, hemicellulase, and cellulase, available from Novo Nordisk A/S, Bagsværd, Denmark); PEELZYME™ (a mixture of *Aspergillus niger* and *Trichoderma reesei* pectinase, hemicellulase, cellulase, and arabinase, available from Novo Nordisk A/S, Bagsværd, Denmark); ULTRAZYM™ (an *Aspergillus niger* enzyme preparation containing polygalacturonase, pectin transeliminase, pectin esterase, and hemicellulase, available from Novo Nordisk A/S, Bagsværd, Denmark); CELLUBRIX™ (a mixture of *Aspergillus niger* and *Trichoderma reesei* cellulases and cellubiases, available from Novo Nordisk A/S, Bagsværd, Denmark); FLAVOURZYME™ (a mixture of *Aspergillus oryzae* exopeptidases and endoproteases, available from Novo Nordisk A/S, Bagsværd, Denmark); ALCALASE® (a *Bacillus licheniformis* serine-type protease, available from Novo Nordisk A/S, Bagsværd, Denmark); NEUTRASE® (a *Bacillus amyloliquefaciens* endoprotease, available from Novo Nordisk A/S, Bagsværd, Denmark); and ESPERASE® (a *Bacillus lentus* endoprotease, available from Novo Nordisk A/S, Bagsværd, Denmark).

The enzyme-treated popcorn kernels may then be recovered using any of the methods known in the art. The recovered kernels may be dried using the methods described herein or known in the art. In the methods of the present invention, the moisture content of the recovered enzyme-treated kernels preferably ranges from about 13% to about 14.5%, and more preferably from about 13.5% to about 14%.

In the methods of the present invention, the enzyme-treated kernels upon being submitted to heat of 350–375° F. produce a maximum popping yield of popped flakes of at least about 90%, more preferably at least about 92.5%, even more preferably at least about 95%, and most preferably at least about 97.5%. The term "maximum popping yield" is defined herein as the percentage of kernels converted to popped flakes when submitted to heat. For example, a 90% maximum popping yield means that out of a 100 kernels, 90 of them were converted to flakes.

The present invention also relates to kernels obtained by the methods of the present invention.

The present invention is further described by the following examples which should not be construed as limiting the scope of the invention.

EXAMPLES

Materials

Chemicals used as buffers and substrates were commercial products of at least reagent grade.

PECTINEX™ ULTRA and CELLUBRIX™ were obtained from Novo Nordisk Biochem North America, Franklinton, NC. PECTINEX™ ULTRA contains *Aspergillus niger* pectinases plus considerable cellulase, cellubiase, hemicellulase, and arabinase activities. CELLUBRIX™ contains *Aspergillus niger* and *Trichoderma reesei* cellulase and cellubiase activities.

Unpopped kernels were separated from popped kernels of various commercial brands including Act II, Healthy Choice, and Trail's End in either "butter" or "light" formula, wiped free of visible debris/fatty stuffs, and mixed before sampling.

Example 1

Rejuvenation of Unpopped Kernels

Unpopped kernels were rejuvenated by mixing approximately 9.5 g of the kernels in a capped/sealed 25-ml glass vial, where the kernels occupied approximately 3/4 volume of the vial, with 0.3 ml of glass distilled water or enzyme solution. The kernels were shaken several times until all the liquid had adsorbed. The vial was then kept closed for four days at room temperature (approximately 23° C.).

The concentration of electrolytes and other small molecular weight (MW) solutes in the enzymatic rejuvenation solution were adjusted by the following method. The original PECTINEX™ ULTRA and CELLUBRIX™ liquids were diluted with one volume water and then re-concentrated to their original volumes using an Amicon Centriprep 10 device equipped with a 10 kDa MW-CO membrane (Amicon, Beverly Mass.). The conductivity of the PECTINEXT™ ULTRA and CELLUBRIX™ solutions following this treatment was 0.42 and 37 mS, respectively. Lower conductivity solutions (0.026 mS) of the above dialyzed enzyme preparations were prepared by further dialysis using a Pierce Slide-a-Lyzer equipped with a 10 kDa MW-CO membrane (Pierce, Rockford, Ill.) to a conductivity of 0.026 mS. The filtrates from this further dialysis were collected and used as controls for the respective enzymatic popcorn treatments.

The enzymatic rejuvenation solution contained 100–1000 and 1000–10000 ppm of PECTINEX™ ULTRA or CELLUBRIX™ based on kernel weight.

Example 2

Effect of Enzymatic Rejuvenation of Popcorn Kernels

Popping was performed in a microwave oven (Tappan Speedwave 1000, "Cook 1" setting) according to the following procedure. About 4.7 g of rejuvenated popcorn (approximately 30–40 kernels) were placed in a 250 ml Pyrex beaker 6.3 cm diameter, 8.6 cm height) capped by a glass dish (Kimax, Petri, 8.7 cm diameter, 1.5 cm height). Between two poppings, the glassware, including the glass tray of the microwave, and the interior of the microwave (door opened) were cooled at room temperature (approximately 23° C.) for 15 minutes. The popping lasted for 2 minutes, in which the first pop occurred after approximately 40–50 sec of microwaving. Duplicates were run for each series of enzyme treatments.

When the kernels were rejuvenated with only water, a 88±2% popping yield was obtained using a popping time of 2.5 minutes, whereas when the popping time was reduced to 2 minutes, the yield decreased to 76±3%. The less than 100% popping yield suggested uneven moisture content and/or hull wall strength distribution among the kernels.

TABLE 1

Effect of Pectinex.

|  | Conductivity* | Popping % |
| --- | --- | --- |
| 100 ppm | 1.4 µS | 74 ± 4 |
| Control | 1.4 µS | 56 ± 4 |
| 300 ppm | 0.5 µS | 92 ± 2 |
| Control | 0.5 µS | 82 ± 2 |
| 1000 ppm | 8.4 µS | 95 ± 2 |
| Control | 8.4 µS | 75 ± 6 |
| $H_2O$ | 1.7 µS | 76 ± 3 |

*For the rejuvenation solution.

TABLE 2

Effect of Cellubrix.

|  | Conductivity* | Popping % |
| --- | --- | --- |
| 1000 ppm | 1.2 mS | 83 ± 4 |
| Control | 1.2 mS | 77 ± 4 |
| 3000 ppm | 5.2 mS | 91 ± 1 |
| Control | 5.2 mS | 83 ± 2 |
| $10^4$ ppm | 12 mS | 88 ± 2 |
| Control | 12 mS | 80 ± 4 |
| $H_2O$ | 1.7 µS | 76 ± 3 |

*For the rejuvenation solution.

The presence of PECTINEX™ ULTRA or CELLUBRIX™ in the rejuvenating solution significantly affected the popping yield. Compared to the control (enzyme-free rejuvenating solution with the same solutes of MW=10 kDa), both enzyme preparations resulted in a 20% increase in the popping yield (Tables 1 and 2). The apparent increase in popping yield by the enzyme treatment may be attributed to weakened hull wall of kernels.

The invention described and claimed herein is not to be limited in scope by the specific embodiments herein disclosed, since these embodiments are intended as illustrations of several aspects of the invention. Any equivalent embodiments are intended to be within the scope of this invention. Indeed, various modifications of the invention in addition to those shown and described herein will become apparent to those skilled in the art from the foregoing description. Such modifications are also intended to fall within the scope of the appended claims. In the case of conflict, the present disclosure including definitions will control.

Various references are cited herein, the disclosures of which are incorporated by reference in their entireties.

What is claimed is:

1. A method for making enzyme-treated unpopped popcorn kernels, comprising:
    (a) contacting popcorn kernels separated from a corn cob with an aqueous solution comprising an effective amount of one or more hull wall-degrading enzymes selected from the group consisting of a pectin-degrading enzyme, cellulose-degrading enzyme, hemicellulose-degrading enzyme, and proteolytic enzyme, for a period of time sufficient to weaken the hull wall of the kernels, wherein the enzyme treatment increases the yield of popped flakes from a given weight of enzyme-treated popcorn kernels compared to untreated popcorn kernels; and
    (b) recovering the enzyme-treated popcorn kernels.

2. The method of claim 1, wherein the popcorn kernels are a hybrid popcorn or open-pollinated popcorn.

3. The method of claim 2, wherein the hybrid popcorn is selected from the group consisting of white, small yellow, medium yellow, and large yellow popcorn.

4. The method of claim 1, wherein the pectin-degrading enzyme is selected from the group consisting of an arabinase, galactanase, pectin esterase, pectate lyase, pectin transeliminase, rhamnogalacturonan acetylesterase, and rhamnogalacturonase.

5. The method of claim 1, wherein the cellulose-degrading enzyme is a cellulase or cellubiase.

6. The method of claim 1, wherein the hemicellulose-degrading enzyme is a hemicellulase or xylanase.

7. The method of claim 1, wherein the proteolytic enzyme is selected from the group consisting of an aminopeptidase, carboxypeptidase, and endoprotease.

8. The method of claim 1, wherein the moisture content of the kernels is maintained in the range of about 10% to about 25% during the enzyme treatment.

9. The method of claim 8, wherein the moisture content of the kernels is maintained in the range of about 14% to about 20% during the enzyme treatment.

10. The method of claim 9, wherein the moisture content of the kernels is maintained in the range of about 14% to about 18% during the enzyme treatment.

11. The method of claim 10, wherein the moisture content of the kernels is maintained in the range of about 15% to about 17% during the enzyme treatment.

12. The method of claim 1, wherein the moisture content of the recovered enzyme-treated kernels is in the range of about 13% to about 14.5%.

13. The method of claim 12, wherein the moisture content of the recovered enzyme-treated kernels is in the range of about 13.5% to about 14%.

14. The method of claim 1, wherein the enzyme-treated kernels have a maximum yield of popped flakes from the kernels of at least about 90%.

15. The method of claim 14, wherein the enzyme-treated kernels have a maximum yield of popped flakes from the kernels of at least about 92.5%.

16. The method of claim 15, wherein the enzyme-treated kernels have a maximum yield of popped flakes from the kernels of at least about 95%.

17. The method of claim 16, wherein the enzyme-treated kernels have a maximum yield of popped flakes from the kernels of at least about 97.5%.

18. A popcorn kernel obtained by the method of claim 1.

19. The popcorn kernel of claim 18, wherein the moisture content of the kernel is in the range of about 13% to about 14.5%.

* * * * *